Sept. 6, 1932.     W. W. TURNBULL     1,875,960

ICE CREAM CONE

Filed April 17, 1930

Inventor

W. W. TURNBULL

Patented Sept. 6, 1932

1,875,960

UNITED STATES PATENT OFFICE

WERD W. TURNBULL, OF DAYTON, OHIO, ASSIGNOR, BY MESNE ASSIGNMENTS, TO NATIONAL BISCUIT COMPANY, A CORPORATION OF NEW JERSEY

ICE CREAM CONE

Application filed April 17, 1930. Serial No. 444,897.

The present invention relates to ice cream cones, and particularly to ice cream cones of the kind embodied in my invention forming the subject matter of application for Letters Patent, Ser. No. 314,687, filed October 24, 1928.

In one embodiment of my invention shown in the aforesaid application, the ice cream cone consists of two pastry shells, nested one within the other, and separated by a confection filling which also serves to cement or hold the two shells together to form a unitary commercial article. In the former application, the mouths of the two pastry shells are approximately the same maximum diameter, so when two are stuck together, one within the other, by the filling, the filling will show as a line between the upper outer edges of the two shells. Cones of this character are tightly wrapped in wax paper or sealed up in tubes or other containers before being packed for shipment. It often happens in very hot weather, or with certain kinds of filling, that the filling will soften at the exposed edges and stick to the wax wrapper or tube, which is annoying and inconvenient to the dispenser of the cones.

The principal object of the present invention is to improve the cone of my previous application, so that the exposed edge of the filling will not be at the largest diameter of the cone, but will be so located that it will not contact with or stick to the wrapper or container, or with another cone.

Figure 1:
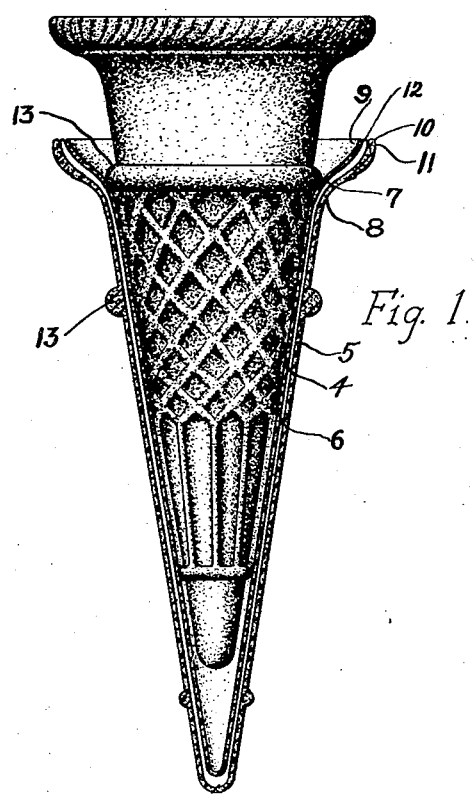
Figure 2:
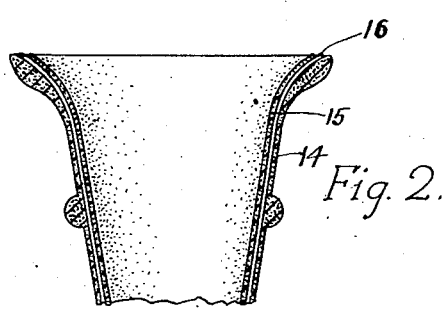

I have accomplished this by the improvements shown in the accompanying drawing, wherein Fig. 1 shows two of the improved cones nested together, one cone being in section; and Fig. 2 is a section of the top of a cone showing a second form of the improvement.

My improved cone has inner and outer pastry shells 4, 5, between which there is a sweetened filling 6, which, in addition to imparting sweetness and flavor to the cone, also sticks or cements the two shells together so as to form a single or unitary ice cream cone.

Both shells are conical throughout most of their lengths, but near the large ends or mouths flare or curve outwardly so that each has an inwardly convex throat 7, 8, terminating in a wide mouth 9, 10. With the throat and mouth of this shape, a single size of cone may be used to serve both large and small portions of ice cream, that is, the cones may be used for serving or selling the usual five cent size, or a large dipper of ice cream may be served and the cones sold for ten cents each.

The outer shell is somewhat larger in diameter than the inner shell so that a space is provided between the shells that is filled with the filling 6. The mouth 10 of the outer shell curves slightly upward at its outer edge, as shown at 11, so that it completely houses the inner shell, the mouth of which is slightly smaller in diameter than the outer one. With this construction, the visible edge 12 of the filling is at the top of the cone, and is spaced from the outer edge of the cone by the thickness of the top of the outer shell. The visible edge of the filling and the tops of both pastry shells lie substantially in a plane perpendicular to the axis of the cone.

When the cones, or a "stick" of cones, are wrapped or packed in a tube, the edge of the filling will not come in contact with the wrapper and cannot stick to it.

The outer shell has a nesting ring 13 which rests on the curved throat of another cone into which it is inserted and prevents wedging and sticking together of the cones during shipment or storage.

Fig. 2 shows a slightly modified form of the invention, in which the outer shell 14 is of the same shape as the outer shell in my previous application, Ser. No. 314,687. The inner shell 15 is slightly smaller at the top than the outer shell so that it lies within it and the edge 16 of the filling is exposed at the top of the cone and not at the edge.

Having thus described my invention, what I claim as new and desire to secure by Letters Patent is:

1. An ice cream cone comprising inner and outer spaced conical pastry shells, a confection filling within the space between the shells, the shells having convexly-curved outwardly flaring shallow mouths open at their upper ends, a bead on the outer shell adapted to rest on the curved throat of the inner shell of another cone into which it may be inserted to prevent wedging and sticking, the mouth of the outer shell being of greater diameter than the mouth of the inner shell, and the edges of the two mouths lying substantially in the same plane.

2. A pastry container comprising spaced inner and outer pastry shells, a confection filling in the space between the shells holding them together, each shell having a conical body portion which flares outwardly at its large end to provide a wide mouth merging substantially into a plane at right angles to the axis of the body portion, the mouth of the outer shell being of greater diameter than the mouth of the inner shell, and the edges of the two mouths lying substantially in the same plane.

WERD W. TURNBULL.